United States Patent
Despres

(10) Patent No.: US 6,341,925 B1
(45) Date of Patent: Jan. 29, 2002

(54) PLUG EJECTING HOLE SAW WITH TWIST-LOCKING INTERCHANGEABLE SAW CUPS

(76) Inventor: Roger J. Despres, 17230 San Mateo St. #L12, Fountain Valley, CA (US) 92708

( * ) Notice: Subject to any disclaimer, the term of this patent is extended or adjusted under 35 U.S.C. 154(b) by 0 days.

(21) Appl. No.: 09/517,215

(22) Filed: Mar. 2, 2000

(51) Int. Cl.$^7$ ................................................ B23B 51/04
(52) U.S. Cl. ...................... 408/204; 408/204; 408/206; 408/207; 408/209; 408/239 R
(58) Field of Search ................................. 408/204, 206, 408/207, 209, 239 R, 703

(56) References Cited

U.S. PATENT DOCUMENTS

| | | | | | |
|---|---|---|---|---|---|
| 3,880,646 | A | * | 4/1975 | Segal | 408/204 |
| 3,973,862 | A | * | 8/1976 | Segal | 408/204 |
| 4,148,593 | A | * | 4/1979 | Clark | 408/204 |
| 4,303,357 | A | * | 12/1981 | Makar | 408/204 |
| 5,108,235 | A | * | 4/1992 | Czyzewski | 408/204 |
| 5,226,762 | A | * | 7/1993 | Ecker | 408/204 |
| 5,435,672 | A | * | 7/1995 | Hall et al. | 408/68 |
| 5,813,802 | A | * | 9/1998 | Ajimi et al. | 408/68 |

* cited by examiner

Primary Examiner—Henry Tsai
Assistant Examiner—Terrence Washington
(74) Attorney, Agent, or Firm—William L. Chapin

(57) ABSTRACT

A plug ejecting hole saw includes a saw cup provided at a front annular edge wall thereof with a plurality of forward protruding angled cutting teeth, and having at a rear end thereof a circular base wall having therethrough a non-circular aperture concentric with the cup. An arbor holder removably attachable to a saw cup of a selected size includes a collar axially slidably holding therewithin a central body having a front nose piece which protrudes axially outward of the collar, the front nose piece having a transverse cross-sectional shape adapted to be inheritably received into the saw cup aperture. The nose piece has formed in longitudinal wall surfaces thereof a pair of diametrically opposed, longitudinally disposed grooves, each of which longitudinally slidably holds therewithin a locking tab member urged forward to abut a separate one of a pair of diametrically opposed, front transversely disposed web ribs formed in the nose piece axially inward of the front transverse face of the nose piece. Each longitudinal groove communicates on one longitudinal side thereof with a separate one of a pair of transversely disposed grooves blocked by a forward biased tab member. When the nose piece is inserted into a saw cup aperture and pushed axially forward, each tab member is pushed rearward in a longitudinal groove, unblocking the transverse grooves and thereby allowing the nose piece to be rotated relative to the saw cup, with peripheral edge walls of the aperture received in the transverse grooves. With sufficient relative rotation, the front tab members become axially aligned with diametrically opposed larger diameter portions of the saw cup aperture, allowing each tab to be urged forward by a front spring to a location blocking a transverse groove and thereby preventing the arbor holder from becoming disengaged from the saw cup. The arbor holder has a coaxial bore provided with left-hand internal threads for threadably receiving an arbor having left-hand external threads, has a rear shank portion adapted to be clamped in a chuck of a power drill, and has a front collet flange for clampingly receiving the shank of a pilot drill. The hole saw includes a pilot drill held in the collet flange. Rotating the saw in a clockwise sense to cut a hole in a workpiece forms a plug lodged within the saw cup, while reversing the drill with the saw cup cocked in the workpiece hole causes the arbor to threadingly advance forward from the base of the saw cup, thus causing the collet flange to advance and push the plug from the saw cup.

17 Claims, 9 Drawing Sheets

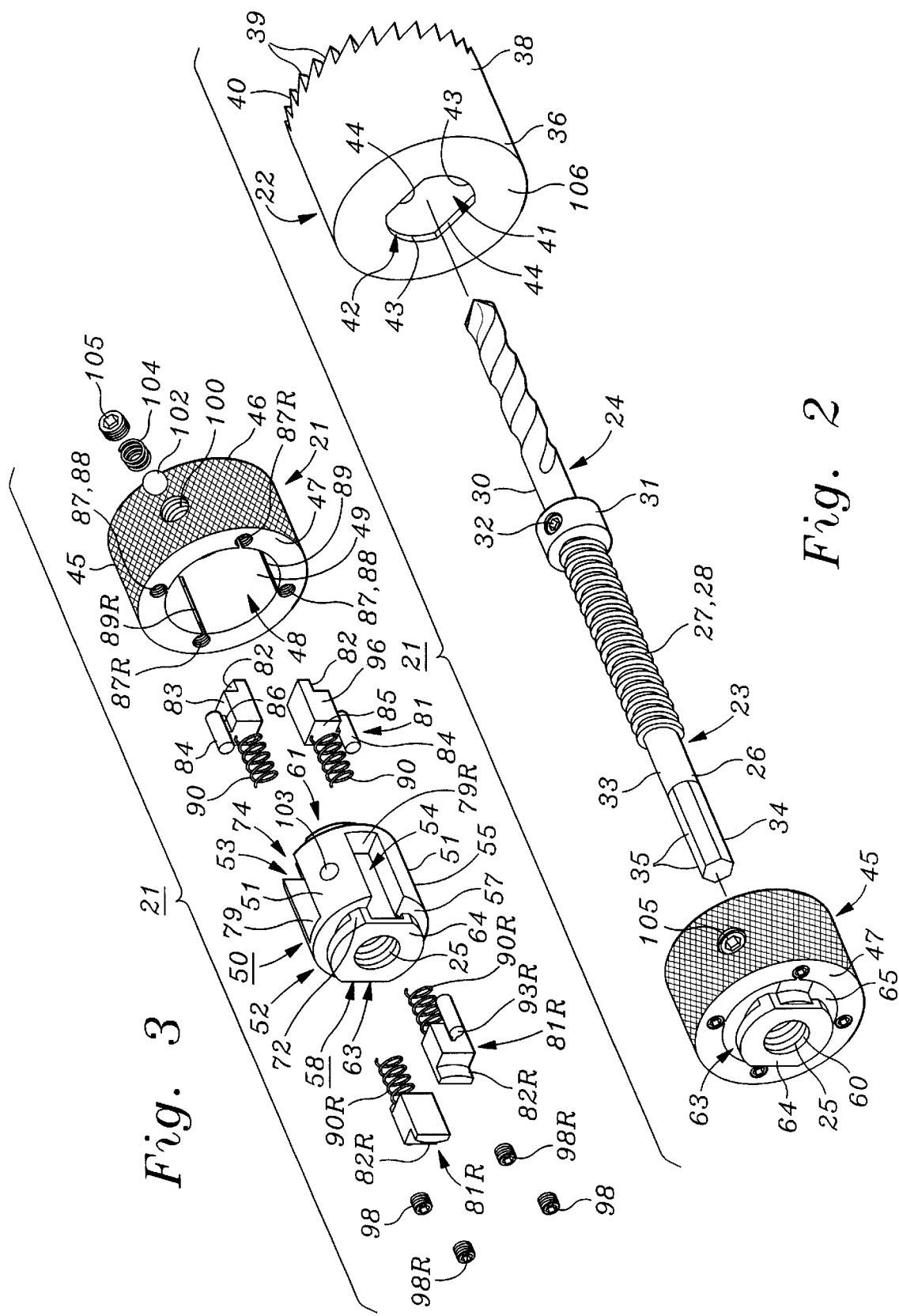

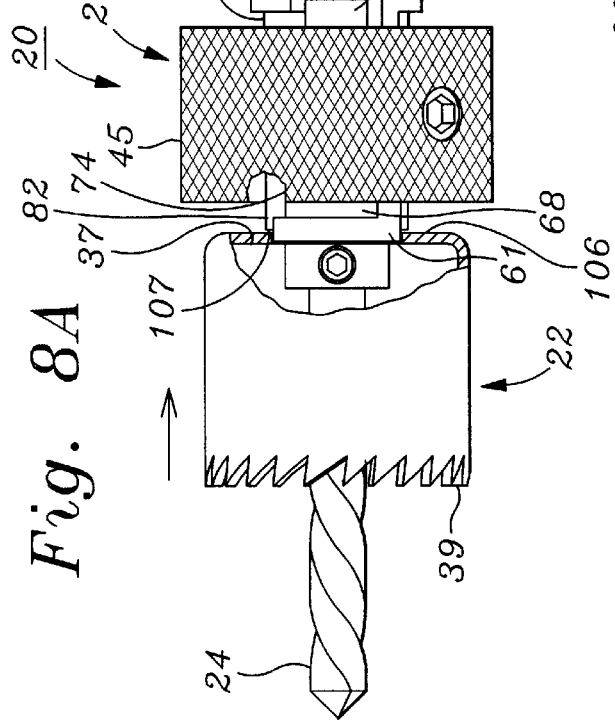
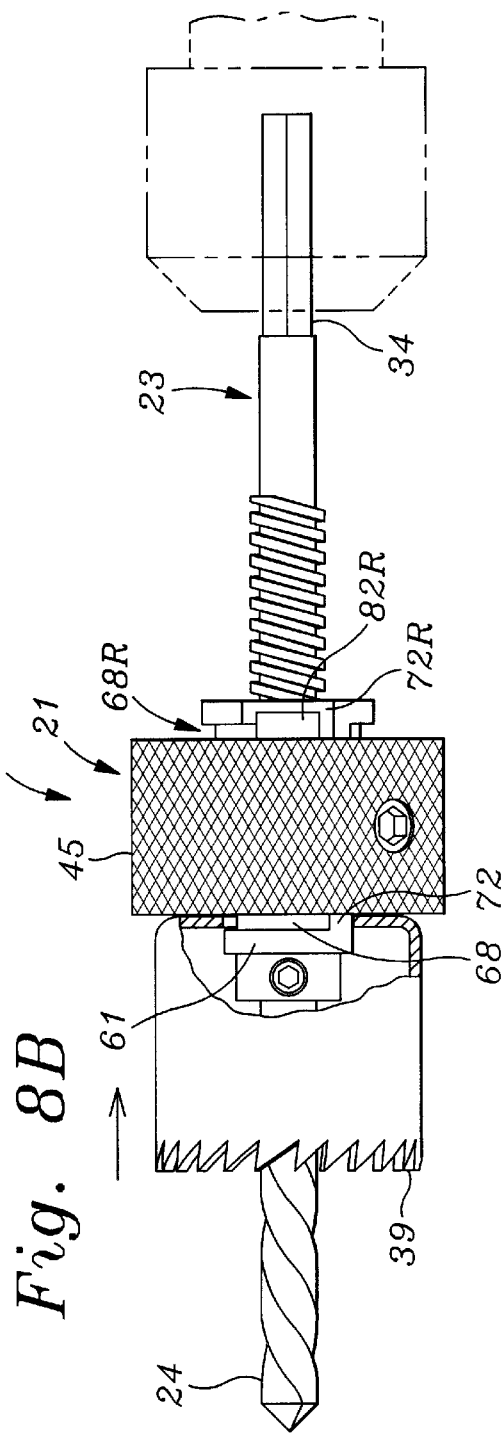

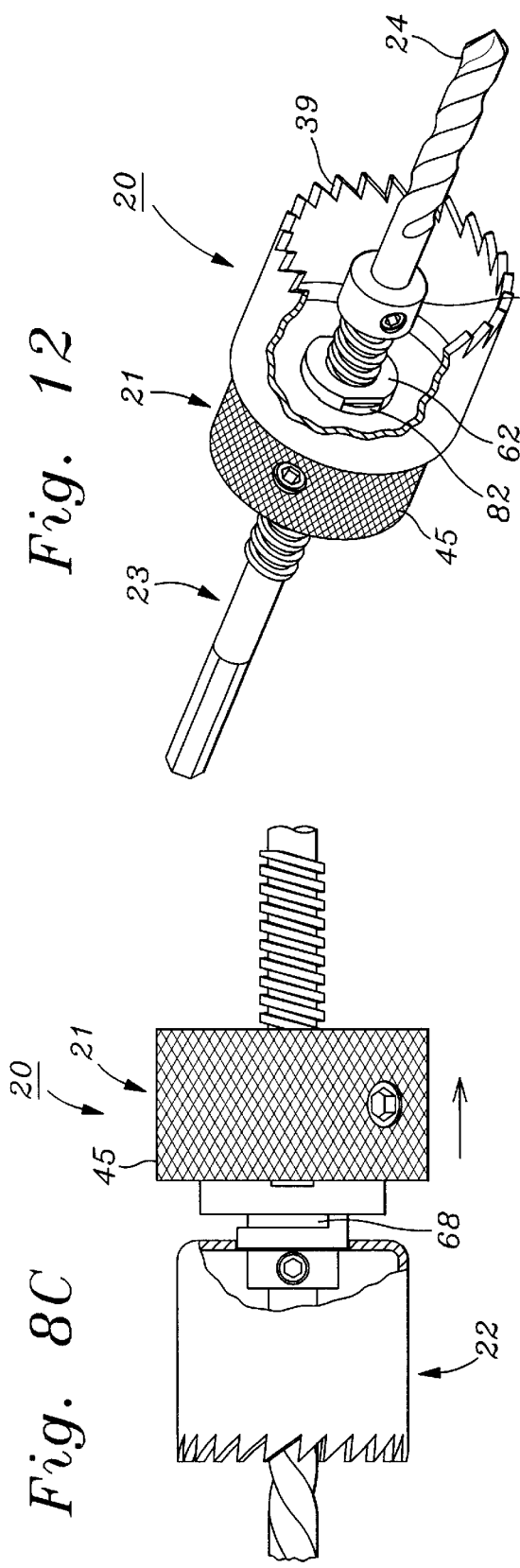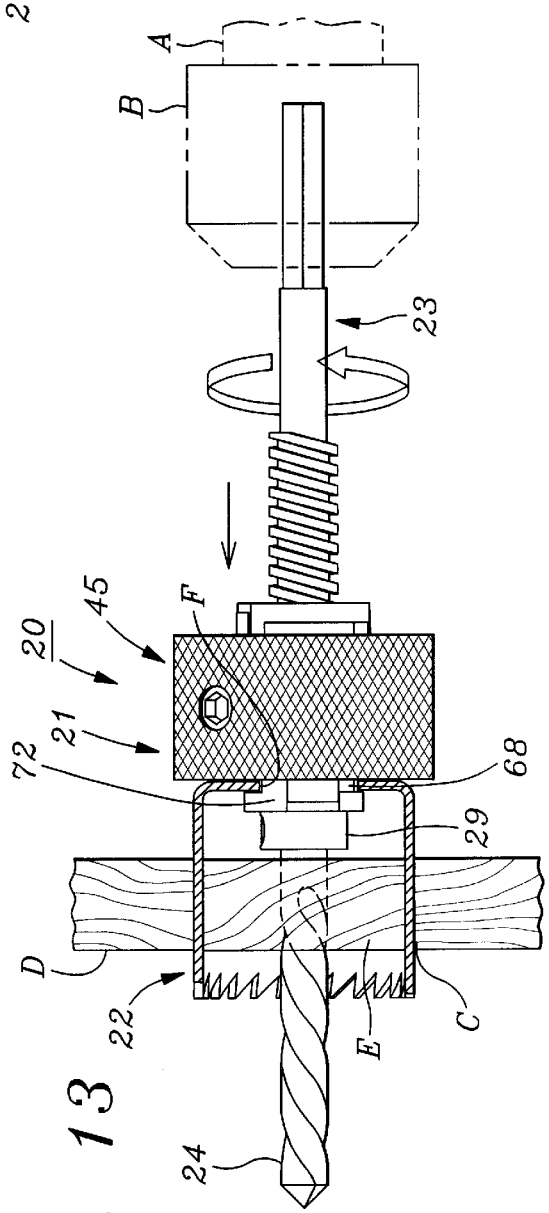

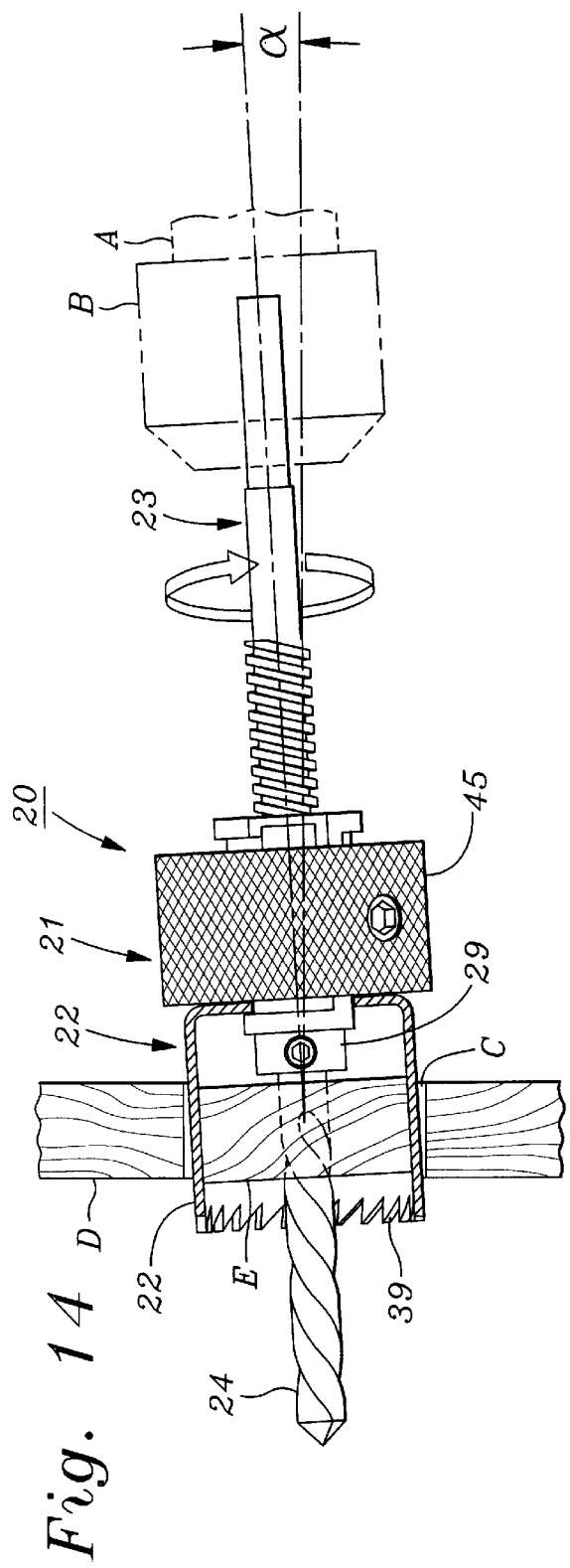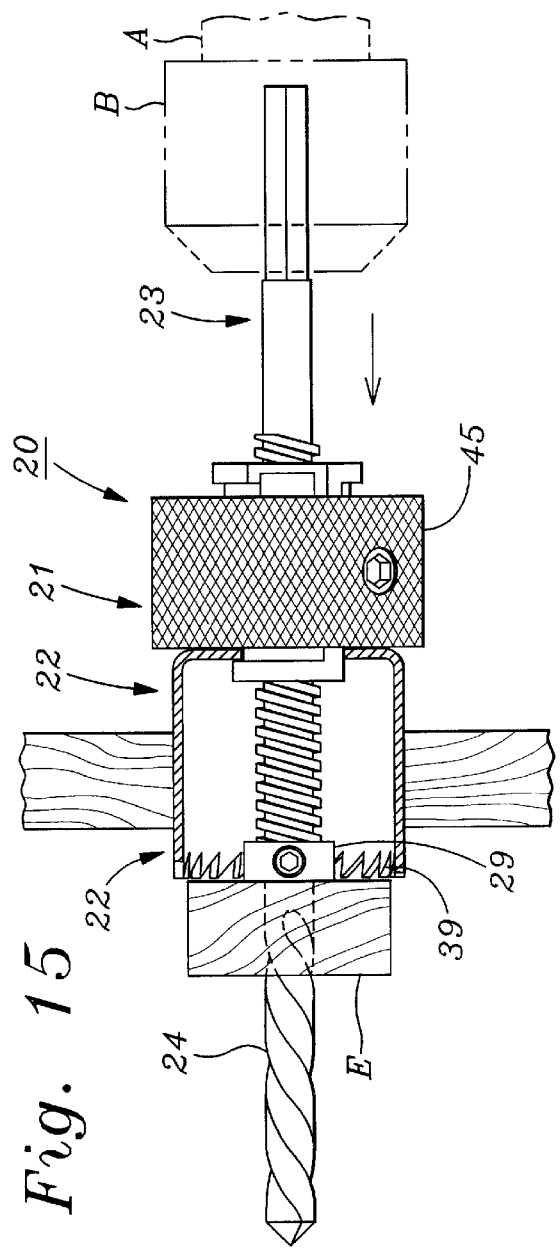

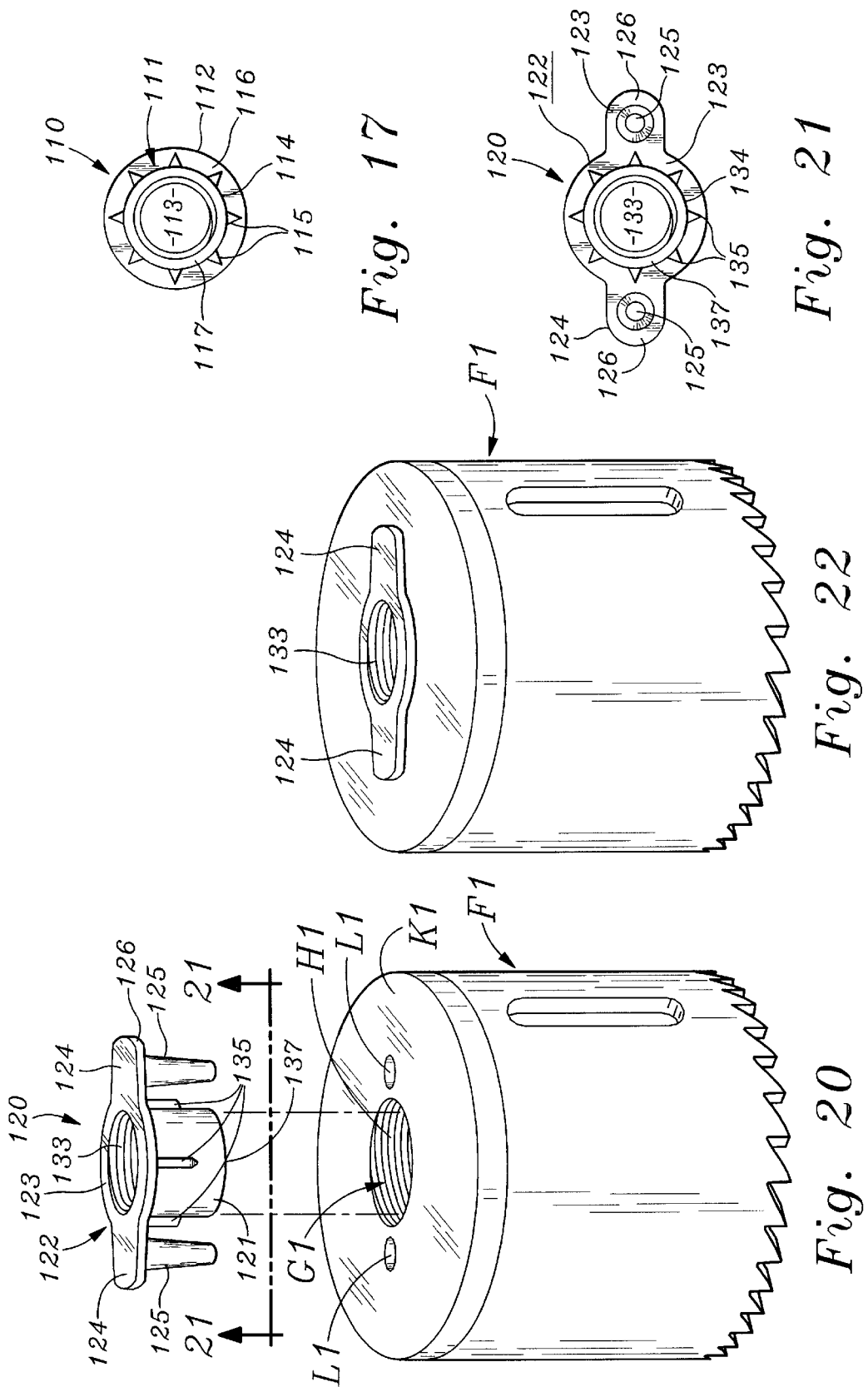

PLUG EJECTING HOLE SAW WITH TWIST-LOCKING INTERCHANGEABLE SAW CUPS

BACKGROUND OF THE INVENTION

A. Field of the Invention

The present invention relates to saws used for cutting circular holes through objects made of wood and various other materials, of the type utilizing a cylindrical saw cup coaxially fastened to an arbor holding a pilot drill which protrudes forward of cutting teeth provided on a front annular surface of the saw cup. More particularly the invention relates to a hole saw which automatically ejects a plug sawed from a workpiece, in which hole saw cups of various diameters may readily be interchangeably mounted on a novel arbor-holder by a twisting, snapping action.

B. Description of Background Art

In U.S. Pat. Nos. 4,741,651 and 5,096,341, the present inventor disclosed plug ejecting hole saws which utilize a left-hand threaded mandrel or arbor that holds a pilot drill, the shank of which is secured in an enlarged diameter flange or collar located at the front end of the arbor. The arbor is screwed into a threaded, arbor-holder bore disposed coaxially through a bushing or thicker portion of a circular disk-shaped base plate which forms the rear end wall of a cup-shaped saw body which has angled circumferentially spaced apart cutting teeth in the front annular end wall thereof. In a hole saw cup of this type, the front, cup-shaped portion of the saw cup and the thicker rear base plate or arbor-holder bushing are generally fabricated as separate metal parts which are brazed together. Thus, this type of hole saw is sometimes referred to as a "bi-metal" hole saw.

A novel feature of the inventions disclosed in the aforementioned patents of the present inventor comprises left-hand threading of both the outer surface of the arbor and the inner threaded bore through the saw cup base. With this arrangement, when the arbor is threaded counterclockwise into the saw cup arbor-holder bore, as viewed from the front of the saw cup and pilot drill end of the arbor, the front flange portion of the arbor advances rearwardly to seat against the inner front wall surface of the saw cup base. The arbor shank, which protrudes rearwardly from the saw cup base is then secured in the collet of a power drill. When the power drill is powered on to turn the pilot drill bit and saw in the usual clockwise cutting direction, as viewed from the rear, shank end of the bit, a counterclockwise reaction torque is exerted on the saw cup teeth by frictional resistance offered by workpiece in response to the cutting action, tending to further tighten and secure the arbor flange against the inner surface of the saw cup base. When the saw cup has penetrated the thickness of a workpiece such as a door panel, a cylindrically-shaped plug of workpiece material becomes lodged tightly within the saw cup, and in prior art hole saws, is difficult to remove from the saw cup. However, in accordance with the '651 and '341 patents, a plug lodged within the saw cup may readily be ejected by powering the drill in a reverse, i.e., counterclockwise direction after a hole has been bored through a workpiece, while maintaining the saw cup stationary. Rotating the drill shank and arbor in a counterclockwise direction by the power drill causes the arbor to be advanced axially forward within the threaded bore of the saw cup, and the front flange of the arbor to abut the rear surface of the plug and eject it forward out of the saw cup bore.

The above-described plug ejecting feature of hole saws disclosed in the present inventor's '651 and '341 patents has provided a highly effective and widely accepted improvement in bimetal hole saws. Subsequent to issuance of those two patents, U.S. Pat. No. 5,435,672 was issued for adapters having a left-hand threaded arbor-receiving bore, and a right-hand external bore. The adapters were designed to be threaded into right-hand threaded arbor-holder bores of existing saw cups, thus accommodating left-hand threaded arbors and permitting the present inventor's novel plug ejecting function to be accomplished using existing hole saw cups having right-hand threaded arbor-holder bores.

Although the novel plug ejecting hole saws disclosed in the present inventor's '651 and '341 patents constituted a substantial advancement in the art for hole saws having a base provided with a threaded bore for receiving an arbor, there is another type of widely employed hole saw cup which heretofore could not utilize the advantageous plug ejecting construction disclosed in those patents. This type of hole saw is sometimes referred to as a "Carbon" type, since it uses hole saw cups fabricated as a unitary structure, e.g., a deep drawn cup, made from high carbon steel. In this type of hole saw, the saw cup base is made of relatively thin stock, thus precluding the use of threaded bore through the base as a means for attaching the saw cup to an arbor. Instead, this type of hole saw typically is provided with a non-circular, e.g., a double-D-shaped central bore through the base of the hole saw cup, which receives the complementary-shaped, enlarged rear portion of an arbor which is secured to the base by a threaded fastening member. The present invention was conceived of to provide a plug ejecting hole saw which may utilize thin base wall, non-threaded saw cups of the type described above.

OBJECTS OF THE INTENTION

An object of the present invention is to provide a plug ejecting hole saw including an arbor-holder which can be attached to hole saw cups of various sizes.

Another object of the invention is to provide a plug ejecting hole saw including an arbor-holder which can be secured to the base of a hole saw cup with non-threaded fastening means.

Another object of the invention is to provide a plug ejecting hole saw including a hole saw cup having a right-hand threaded arbor-securing bore through the base of the hole saw cup, and an arbor-holder or adapter press fittable into the arbor securing bore of the saw cup and having through the adapter a left-hand threaded bore for threadingly receiving an arbor.

Another object of the invention is to provide a plug ejecting hole saw including an arbor-holder which is removably securable to the base of a non-threaded hole saw cup having an unthreaded aperture through the base of the hole saw cup for attaching to an arbor, the arbor-holder having therethrough an axially disposed left-hand threaded bore for threadingly receiving an arbor.

Another object of the invention is to provide a plug ejecting hole saw including an arbor-holder which is removably securable in an unthreaded aperture through the base of a hole saw cup, without accessing the interior of the hole saw cup.

Another object of the invention is to provide a plug ejecting hole saw including an arbor-holder which is removably securable to a hole saw cup provided with a non-circular aperture through its base, the arbor-holder having a front nose piece insertable forward through the aperture, and locking tabs which spring forward to lock the arbor-holder axially with respect to the saw cup when the arbor-holder is rotated with respect to the saw cup base.

Another object of the invention is to provide a plug ejecting hole saw including an arbor-holder having an outer collar and inner body disposed axially therethrough, the inner body having a lefthand threaded bore disposed axially therethrough for receiving an arbor, a front nose piece slidably holding locking tabs and circumferential grooves which cooperate to lockingly engage the base of a hole saw cup when the front nose piece has been inserted into and rotated in a first direction within an aperture provided through the base of saw cup, the locking tabs and grooves being released from locking engagement with the saw cup base when the collar of the arbor-holder is pulled axially rearward with respect to the inner body thereof and rotated in the opposite direction.

Another object of the invention is to provide a plug ejecting hole saw including an arbor-holder having an outer collar which axially slidably holds an inner body having disposed axially therethrough a left-hand thread for receiving an arbor, the inner body having a first, front, nose piece snapping lockingly engageable and releasable within a first size aperture through a selected one of a first plurality of hole saw cups, and a second, rear, nose piece releasably engageable within a second size aperture through a selected one of a second plurality of hole saw cups.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a hole saw for use with power drills which automatically ejects a cylindrically-shaped plug produced in cutting a hole through an object by the drill powered in a first direction, when the power drill is operated in the opposite direction.

A plug ejecting hole saw according to the present invention includes an arbor-holder removably attachable to a selected one of a plurality of hole saw cups of various sizes. A main embodiment of a plug ejecting hole saw according to the present invention includes an arbor-holder removably attachable to a selected hole saw cup of the type having a cylindrical cup-shaped body provided with angled cutting teeth protruding from the front annular surface of the body, and a relatively thin rear circular base wall having through its thickness dimension a non-circular aperture for attachment to an arbor concentrically aligned with the front annular surface of the body, A preferred arbor attachment aperture for saw cups according to the present invention has a "double-D" shaped perimeter formed from diametrically opposed arc segments of a circle which is concentric with the circular hole saw cup face, the circle being truncated on opposite sides thereof by a pair of chords equidistant from and parallel to a diameter which perpendicularly bisects the arcs. Thus, a preferred arbor attachment aperture provided through the base of a saw cup according to the present invention has an inner peripheral edge wall consisting of a pair of diametrically opposed laterally symmetric circular arc segments centered at 90-degree and 270-degree locations of a circle, and two diametrically opposed flat vertical segments centered on zero-degree and 180-degree locations of the circle.

A main embodiment of an arbor-holder for use with hole saw cups of the type having a double-D-shaped arbor-holder aperture through the base of the saw cup includes an outer cylindrical housing or collar having therethrough a circular bore which axially slidably holds a body having cylindrical outer wall surfaces which fit within the bore. The cylindrical body has a nose piece or boss which protrudes axially outwardly of the front annular surface of the collar, the nose piece having a longitudinally or axially disposed outer surface with an outer transverse cross-sectional shape similar to that of a double-D-shaped arbor-holder aperture through a saw cup base, but having a slightly smaller size which facilitates insertion of the nose piece into the aperture.

The nose piece has a pair of transversely disposed grooves, each of which extends radially inwardly into a separate one of two axially disposed, curved side walls of the nose piece, each of the grooves having a transverse or outer edge wall located inwardly of and parallel to the outer transverse edge wall or front face of the nose piece. The rear or inner edge wall of each of the two transversely disposed grooves is defined by the front or outer transversely disposed annular wall surface of the cylindrical body within the collar.

Each of the two transverse nose-piece grooves is disposed circumferentially from a location circumferentially spaced apart from a junction between a flat and curved side of the double-D-shaped nose piece. Thus the transverse grooves form a pair of axial shoulder ribs, which are disposed rearwardly or axially inwardly from the front transverse face of the nose piece to the front or outer transverse surface of the cylindrical body. The nose piece also includes a pair of diametrically opposed, rectangularly-shaped longitudinal grooves formed in opposite flat sides of the nose piece, which are disposed rearwardly or axially inwardly from a transverse plane located axially inwardly or rearwardly of the front or outer transverse face of the nose piece, but axially outwards or forward of a transverse plane containing the front or outer transverse edge walls of the transverse grooves.

Each of the two diametrically opposed longitudinal grooves is centered on a longitudinal plane which bisects the two diametrically opposed flats of the nose piece. Also, each longitudinal groove is disposed rearwardly or axially inwardly through an adjacent transverse groove and extends through the inner cylindrical body to a location forward of the rear transverse wall surface of the inner cylindrical body, and penetrates the outer cylindrical wall surface of the inner cylindrical body. Each longitudinal groove longitudinally slidably receives a locking tab support lug having a front locking tab portion which has a length approximating that of that portion of the longitudinal groove located in the nose piece, and a radial thickness slightly greater than that of the radial depth of the groove. Each lug also has a rear portion of greater thickness than the front tab portion, and is slidably received within that portion of a longitudinal groove located within the inner cylindrical body. The rear portion of each lug is urged axially forward by first spring means comprising a compression spring, and is limited in forward axial movement by contact of a retainer pin attached to the lug and slidably received within a threaded blind bore axially disposed within the collar, with an end wall of the bore. The arbor-holder also includes second spring means which resiliently urges the inner cylindrical body of the arbor-holder rearward or axially inwardly within the collar.

When the inner cylindrical body of the arbor-holder is pushed axially forward or outwardly from the collar against the resilient force provided by the first spring means, the nose piece is displaced forward or axially outwardly of the front annular face of the collar. This displacement causes the front shoulder edges of the longitudinal tab grooves to move forward of the front transverse edge walls of the tabs. With the cylindrical inner body pushed sufficiently far forward within the collar, the rear transverse edge walls of the transversely disposed grooves are moved axially outwards or forward of the front edges of the tabs, unblocking the junctions or passageways between each transverse groove and the longitudinal tab groove adjacent to it. Also, when the nose piece is inserted forward into the arbor-holder aperture of a hole saw cup, contact of the rear surface of the saw cup with the front surfaces of the tabs pushes each tab rearwardly within its longitudinal groove against a restoring force provided by a compression spring. Rearward motion of the tabs unblocks the transverse grooves, thus allowing portions of the peripheral aperture edge wall be rotatably received within adjacent transverse grooves of the nose piece, and thereby allowing the entire arbor assembly to be rotated clockwise with respect to the hole saw cup. When the rotation angle approximates forty-five degrees, each of the two locking tabs springs axially forward in response to spring forces exerted by the compression springs, into a separate one of the two radial clearance spaces formed between each nose piece flat holding a tab, and an adjacent curved inner peripheral edge wall of the saw cup aperture. In this position, the curved portions of the nose piece, which have outer longitudinal surfaces spaced farther apart than the flats of the peripheral wall adjacent the aperture through the saw cup base, are axially aligned with the peripheral wall flats. Thus, the peripheral wall flats are retained axially within the transverse nose piece grooves in this position. Further clockwise rotation of the arbor-holder with respect to the saw cup base is limited by contact of an axially disposed nose piece rib with an intersection between the curved and flat portions of the peripheral edge wall of the hole saw cup aperture. Counterclockwise rotation of the arbor-holder relative to the saw cup is limited by contact of a longitudinal edge of a locking tab with an intersection between a curved and flat edge wall of the saw cup aperture. With this arrangement, the saw cup is locked axially and rotationally to the arbor-holder.

The inner cylindrical body of the arbor-holder according to the present invention has through its thickness dimension an axially disposed bore coaxial with the arbor-holder collar. The bore has internal left-hand threads adapted to receive an arbor which may be threaded into the bore through a front opening thereto in the front or outer face of the nose piece, either before or after the arbor-holder has been snap-locked into a saw cup as described above.

The arbor is provided with a shank which protrudes rearwardly from the rear surface of the arbor-holder and which is clamped in the collet of a power drill. A collet flange at the front end of the arbor-holder holds a pilot drill, and the rear face of the collet flange seats against the front face of the arbor-holder nose piece, when the arbor is threadingly tightened in the arbor-holder bore in a counter-clockwise sense, as viewed from the front of the pilot drill. The rearwardly protruding shank of the arbor is then clamped in the chuck of a power drill, which is then powered on to rotate the hole saw in a clockwise sense as viewed from the shank end of the hole saw, and cut a circular hole through a workpiece, leaving a cylindrically-shaped plug of workpiece material lodged within the hole saw cup. The drill is then angled slightly away from an orientation perpendicular to the workpiece used to bore the hole, thus slightly cocking the hole saw cup within the hole cut through the workpiece, and thereby frictionally lodging the hole saw cup within the workpiece hole. The power drill is then powered on in a reverse sense to rotate the arbor in a reverse sense, thus causing the arbor and flange to be threadingly advanced within the arbor-holder bore, thereby ejecting the workpiece plug forwardly out from the saw cup body.

When it is desired to remove the arbor-holder from a saw cup body, e.g., to install the arbor-holder and arbor in a different saw cup body, which may be of a different size, the collar of the arbor-holder is pulled rearwardly from the front nose piece and saw cup body, thus retracting the locking tabs from the space between the flat sides of the nose piece and the adjacent curved peripheral walls of the saw cup aperture. With the locking tabs thus disengaged from the hole saw cup, the arbor-holder can be rotated counterclockwise to align the flats and curves of the nose piece once again with the correspondingly shaped edge walls of the saw cup aperture, thus allowing the nose piece and entire arbor-holder to be pulled rearwardly and disengaged from the saw cup body.

BRIEF DESCRIPTION OF THE DRAWINGS

FIG. 2 is a perspective view of the hole saw of FIG. 1.

FIG. 3 is an exploded rear perspective view of an arbor-holder according to the present invention.

FIG. 8A is a partly broken away side elevation similar to FIG. 6, and showing an arbor and pilot drill installed in the arbor-holder and showing a front nose piece of the arbor-holder inserted partially into a saw cup aperture.

FIG. 8B is a view similar to that of FIG. 8A, showing the nose piece of the arbor holder fully inserted into the saw cup aperture.

FIG. 8C is a view similar to that of FIG. 8B, showing how the arbor holder of FIG. 8B is removed from a saw cup.

FIG. 12 is a partly broken perspective away view of the article of FIG. 1, showing the arbor, adapter, and saw cup thereof assembled together, preparatory to drilling a hole.

FIGS. 13–15 illustrate the manner of using the hole saw of FIG. 1 to drill a hole and eject a plug.

FIG. 17 is a lower plan view of the adapter of FIG. 16.

FIG. 20 is a perspective view of a modification of the adapter of FIG. 16.

FIG. 21 is a lower plan view of the adapter of FIG. 20.

FIG. 22 is a perspective view showing the adapter of FIGS. 20 and 21 installed in the saw cup of FIG. 20.

DESCRIPTION OF THE PREFERRED EMBODIMENTS

FIGS. 1–12 illustrate a main embodiment of a plug ejecting hole saw with twist-locking interchangeable saw cups according to the present invention, while FIGS. 13–15 illustrate how the hole saw is used. FIGS. 16–22 illustrate an embodiment of the invention useable with hole saw cups having threaded arbor receiving bores.

Figure 1:
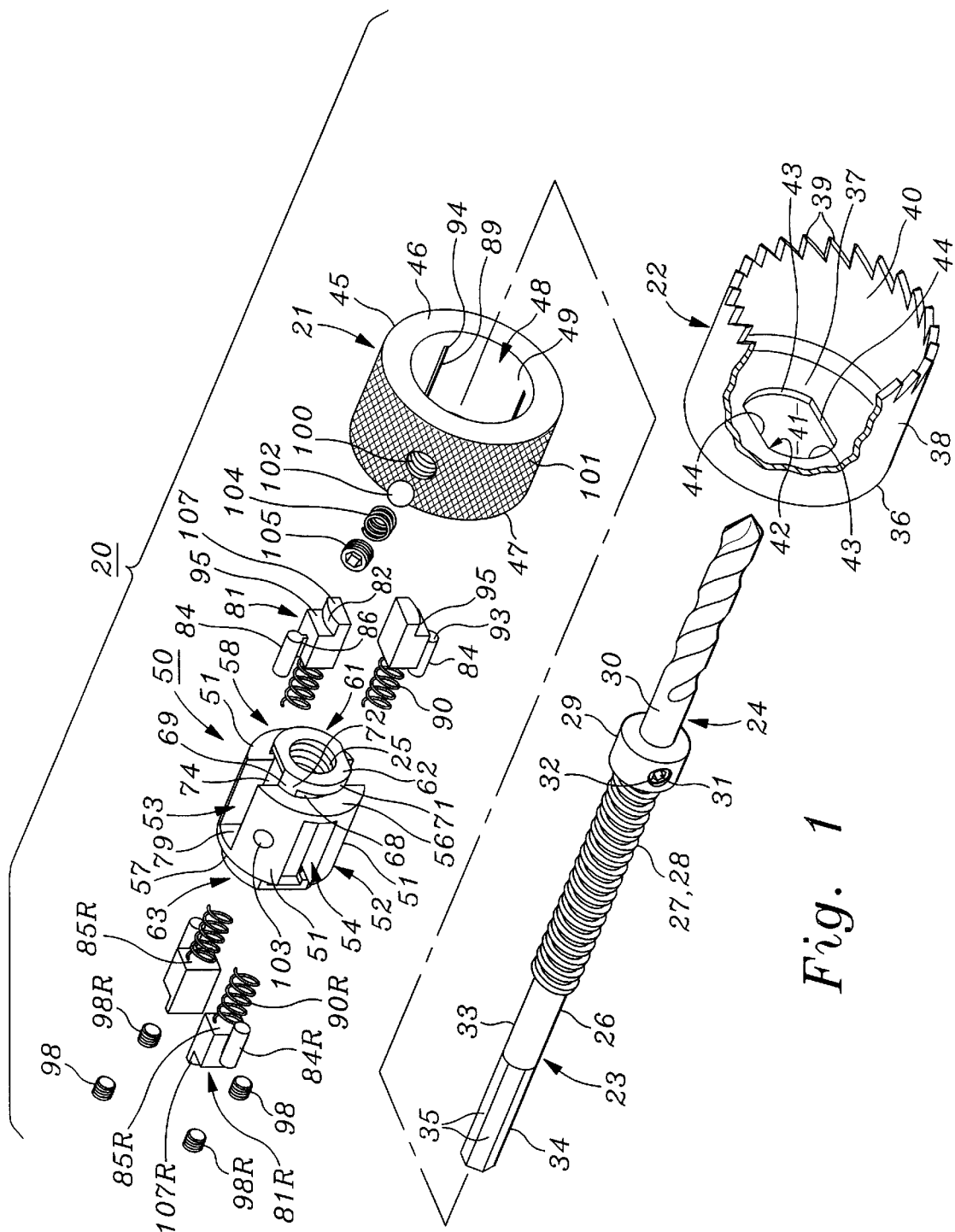
FIG. 1 is an exploded perspective view of a plug ejecting hole saw with snap action saw cup interchangeability according to the present invention.
Figure 4:
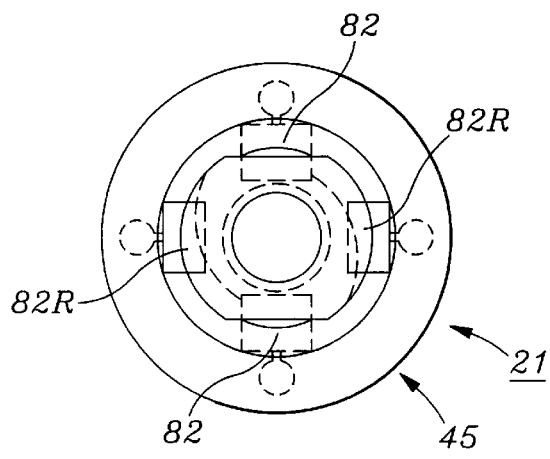
FIG. 4 is a front elevation view of the arbor-holder of FIG. 3.

Referring first to FIG. 1, a plug ejecting hole saw 20 with twist-locking interchangeable saw cups according to the present invention may be seen to include a novel arbor holder 21, a saw cup 22 removably fastenable to the arbor-holder, and an arbor 23 holding a pilot drill 24 threadably receivable within a threaded bore 25 provided through the length of the arbor-holder.

As shown in FIG. 1, arbor 23 includes a longitudinally elongated body 26 having a front portion 27 provided with external left-hand helical threads 28 which extend rearwardly from a front annular ring-shaped collet flange 29 which clampingly receives the rear shank 30 of pilot drill 24, as for example, by a set screw 31 tightened into a radial bore 32 in the collet flange, against the shank of the pilot drill. Arbor 23 also includes an intermediate unthreaded shank portion 33 which is disposed longitudinally rearward of front threaded portion 27 of the arbor, and a rear shank portion 34. Rear shank portion 34 is preferably provided with longitudinally disposed flats 35 forming a hexagonal cross section adapted to be clampingly received in the chuck of a power drill.

Referring still to FIG. 1, it may be seen that hole saw cup 22 comprises essentially a cylindrical cup-shaped body 36 having a circular base 37 and a downwardly depending cylindrical shell 38 which may be fabricated as a deep drawn article from relatively thin-gauge, e.g., 0.030–0.060 inch thick, high carbon steel, although the exact dimensions, materials, composition and other such details of the hole saw cup are not essential to the present invention. Hole saw cup 22 has a plurality of triangularly-shaped saw teeth 39 which protrude axially outwardly at regular circumferential intervals from front annular ring-shaped surface 40 of hole saw cup body 36. Teeth 39 may be formed by cutting and tempering hole-saw cup body 36, or may be fabricated separately as teeth of a toothed ring which is brazed to the front annular surface 40 of the saw cup body.

As shown in FIG. 1, base 37 of hole saw cup 22 has through its thickness dimension a non-circular aperture 41 concentric with front annular surface 40 and cylindrical shell 38 of hole saw cup body 36. Aperture 41 is preferably of a conventional shape adapted to receive prior-art hole saw arbor-holders. Thus, as shown in FIG. 1, aperture 41 has a "double-D" shaped perimeter wall 42 formed from a pair of diametrically opposed arc segments 43 of a circle concentric with front annular surface 40 of saw cup body 36, and a pair of diametrically opposed straight edge segments 44 which are chords of the circle, and equidistant from and parallel to a diameter which perpendicularly bisects the arc segments. Thus, a preferred arbor attachment aperture 41 through base 37 of hole saw cup 22 has a peripheral edge wall consisting of a pair of diametrically opposed, laterally symmetric circular arc segments 43 centered at ninety degree and two-hundred and seventy-degree locations, respectively, of a circle concentric with body 36 of the hole saw cup, and two straight, flat diametrically opposed vertical segments centered at zero-degree and one-hundred and eighty-degree locations, respectively, of the circle.

Referring now to FIGS. 2–7, in addition to FIG. 1, hole saw 20 according to the present invention may be seen to include a novel arbor-holder 21. As shown in those figures, arbor-holder 21 includes an outer cylindrically-shaped housing or collar 45. Collar 45 of arbor-holder 21 has front and rear transverse faces 46 and 47, respectively, which are perpendicular to the longitudinal axis of the collar. A circular cross section bore 48 is disposed axially through collar 45 and has an inner cylindrical wall surface 49 which axially slidably receives outer cylindrical surfaces 51 of an axially elongated, central locking body 50 received within the bore.

As shown in FIGS. 1–3, locking body 50 has a radially outer portion 52 having a generally cylindrical shape of the same axial length as collar 45, modified by front and rear pairs 53, 54, respectively, of longitudinally disposed, relatively deep, rectangular grooves formed in the outer wall surface 55 of the locking body, forming therebetween circular arc-shaped cylindrical quadrant surfaces 51. As may be seen best by referring to FIGS. 2 and 3, radially outer portion 52 of locking body 50 preferably has an axial length equal to that of collar 45. Thus constructed, front and rear annular surfaces 56 and 57, respectively, of outer radial portion 52 of locking body 50 are coplanar or flush with front and rear annular surfaces 46 and 47, respectively, of collar 45.

As shown in FIGS. 1, 2 and 3, locking body 50 has an inner radial portion 58 disposed coaxially within outer portion 52, the inner radial portion having disposed axially therethrough a bore 25 having a left-handed threaded inner surface 60 for threadingly receiving arbor 23. As may be seen best by referring to FIGS. 1, 2 and 3, inner radial portion 58 of locking body 50 is provided with a front nose piece or boss 61 having a transversely disposed front face 62 which protrudes axially outward of front annular faces 56 and 46 of inner body portion 50 and collar 45. Front nose piece 61 has a double-D-shaped transverse cross-sectional shape adapted to be conformally inserted into aperture 41 through base 37 of hole saw cup 22. In the preferred embodiment of hole saw 20, locking body 50 of arbor-holder 21 preferably includes a second, rear, double-D-shaped nose piece 63 of different size than front nose piece 61 and having a rear transverse face 64. Rear nose piece 63 is adapted to be conformally inserted into an aperture of different size than front nose piece 61, enabling the arbor-holder to be used reversibly with hole saw cups 22 having two different size arbor-mounting apertures 41. However, as will be made clear in the ensuing description of the construction and function of hole saw 20, the novel and advantageous advantages of the hole saw may be achieved with an arbor-holder having a single nose piece.

Referring now to FIGS. 1–5, it may be seen that a preferred, double nose piece embodiment of arbor-holder 21 according to the present invention includes a locking body 50 provided with a second, rear nose piece 63 having an outer, rear face 64 which protrudes axially outwardly or rearwardly of rear annular portion 65 of outer body portion 50, and of rear annular surface 47 of collar 45.

Referring now to FIGS. 1–6, it may be seen that front nose piece 61 has a double-D-shaped transverse cross sectional shape. Thus, front nose piece 61 includes a pair of diametrically opposed, curved, diametrically opposed side walls 66 disposed longitudinally between front annular face 62 of the nose piece and front annular face 56 of outer radial portion 52 of locking body 50. Curved side walls 66 coincide with a circle concentric with the longitudinal axis of nose piece 61. Nose piece 61 also includes a pair of flat, diametrically opposed side walls 67 disposed longitudinally between front annular face 62 of the nose piece and front annular face 56 of outer radial portion 52 of locking body 50. Flat side walls 67 of nose piece 61 are chords of the circle coincident with curved side walls 66, and are equidistant from and parallel to a diameter which perpendicularly bisects the arc segments.

As shown in FIGS. 1–6, front nose piece 61 of arbor-holder 21 has formed in curved longitudinal side walls 66 thereof a pair of transversely disposed, rectangular cross section grooves 68 which extend radially inwardly from the outer longitudinal surface 69 of the curved side wall. Each of the two transversely disposed grooves 68 has a front or outer transverse side wall 70 located inwardly of and parallel to front face 62 of nose piece 61, forming therebetween an arc-shaped web 71. Also, each transverse groove 68 has a rear or inner side wall defined by and coextensive with front annular surface 56 of outer radial portion 52 of locking body 50.

As may be seen best by referring to FIGS. 3, 5, 6 and 7, each transverse groove 68 of front nose piece 61 is disposed in a counterclockwise direction from a location counterclockwise of the intersection between a curved side wall 66 and flat side wall 67, thus forming a longitudinal rib web 72, which is disposed rearwardly or axially inwardly from a front arc-shaped web 71. Front nose piece 61 also has formed in flat longitudinal side walls 67 thereof a pair of diametrically opposed, longitudinally disposed rectangular cross section grooves 74. Each longitudinal groove 74 is disposed axially inwardly or rearwardly from a front edge wall 75 located inwardly of and parallel to front face 62 of nose piece 61, forming therebetween a front transversely disposed rectangular web 76. Preferably, front edge wall 75 of each longitudinal groove 74 is located axially forward or outwardly of front edge wall 70 of transverse grooves 68.

Each longitudinal groove 74 has a flat, axially disposed bottom wall 70 and axially disposed side walls 78 perpendicular to the base wall. As may be seen best by referring to FIG. 1, each of the two longitudinal grooves 74 is disposed rearwardly or axially inwardly from a front web 76 through an adjacent transverse groove 68, and penetrates front annular face 56 and outer cylindrical wall surface 55 of outer radial portion 52 of locking body 50. Each longitudinal groove 74 has a rear transversely disposed end wall 79 located forward or axially outwardly of rear annular face 57 of radial outer portion 52 of body 50, forming therebetween a rear transversely disposed web 80.

Figure 6:
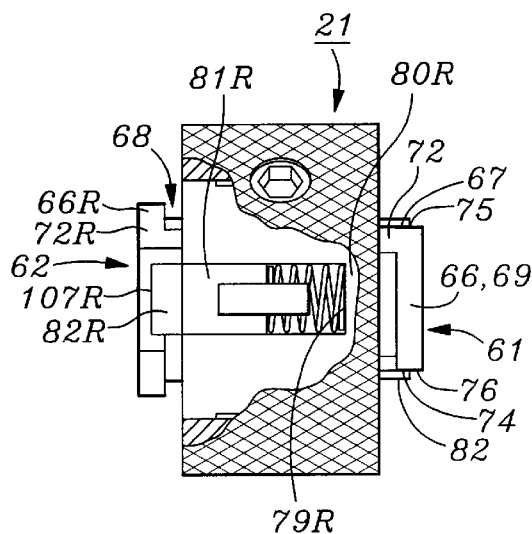
FIG. 6 is a side elevation view of the arbor-holder of FIG. 3.
Figure 5:
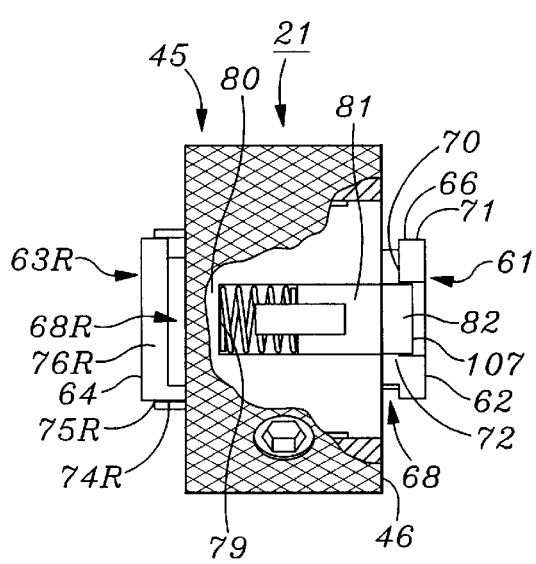
FIG. 5 is an upper plan view of the arbor-holder of FIG. 3.

Referring now to FIGS. 1, 3 and 6, it may be seen that arbor-holder 21 includes a pair of front locking lugs 81 axially slidably received within longitudinal grooves 74 in locking body 50. Each front locking lug 81 has the shape of an axially elongated, rectangular block having a front rectangularly blocked shaped step portion 82 of reduced height. As will be described in detail below, front rectangular block-shaped step portion 82 of lug 81 serves to lock front nose piece 61 of arbor-holder 21 within aperture 41 of hole saw cup 22, and will henceforth be referred to as a locking tab.

As shown in FIGS. 1 and 3, each front locking lug 81 has protruding from the upper surface 83 thereof a longitudinally elongated and disposed cylindrical retainer pin 84 which protrudes axially rearward or inwardly of rear transverse surface 85 of the locking lug. As may be seen best by referring to FIGS. 1 and 3, the retainer pin 84 of each locking lug 81 is joined to the upper surface 83 of the locking lug by a thin, axially disposed rectangular web 86 which depends downwardly from the lower cylindrical surface of the locking pin.

Referring now to FIGS. 1 and 3, it may be seen that collar 45 is provided with a pair of diametrically opposed, longitudinally disposed blind bores 87 which extend axially forward from rear annular surface 47 of the collar. Each bore 87 is adjacent and parallel to inner cylindrical wall surface 49 of the collar, and has a circular outer radial portion 88 adapted to axially slidably receive a retainer pin 84. Also, each bore 87 has at an inner radial edge thereof a longitudinally disposed rectangular slot 89 which penetrates the outer circular radial portion 88 of the bore at an outer radial edge of the slot and which penetrates the inner cylindrical wall surface 49 of the collar at an inner radial edge of the slot. Slots 89 are provided to longitudinally slidably receive webs 86 joining retainer pins 84 to locking lugs 81.

As may be best understood by referring to FIGS. 1–3, each front locking lug 81 is preferably installed in arbor-holder 21 by first positioning the inner block-shaped portion of the locking lug in the rear portion of a longitudinal groove 74 in locking body 50, with a helical compression spring 90 bearing against rear wall surface 79 of the groove and rear wall surface 85 of the locking lug. Locking body 50 is then positioned coaxially rearward of rear surface 47 of collar 45 with retainer pins 84 axially aligned with retainer pin bores 87, and the locking body is inserted axially forward into bore 48 of collar 45, simultaneously with insertion of retainer pins 84 into retainer pin bores 87. Forward motion of each front locking lug 81 relative to front annular surface 46 of collar 45 is limited by contact between front face 93 of a retainer pin 84 abutting a front transverse end wall 94 of a retainer pin bore 87. Thus limited in forward axial motion, front face 95 of thicker rear portion 96 of the front locking lug 81 is coplanar or flush with front annular surface 46 of collar 45.

Compression spring 90 of front locking lug 81 of arbor-holder 21 also provides means for spring biasing locking body 50 axially rearwardly within bore 48 of collar, so that front annular face 56 of radially outer portion 52 of locking body 50 is coplanar or flush with front annular face 46 of collar 45. Arbor-holder 21 also includes means for spring biasing locking body 50 axially forward with collar 45. In a preferred embodiment of arbor-holder 21, the arbor-holder is of a double ended, push-pull construction having a rear nose piece 63 which protrudes rearward from collar 45, the rear nose piece being substantially identical in structure and function to front nose piece 61, but of a different size for attachment to hole saw cups 22 having an arbor mounting aperture 41 of different size than those which front nose piece 61 is adapted to conformally fit within. In this preferred embodiment, forward or axially outward spring biasing of front locking body 50 and front nose piece 61 within collar 45 is accomplished by a pair of rear locking lugs 81R (Rear) and helical rear locking lug compression springs 90R identical in structure and function to front locking lugs 81 and springs 90, but which function in a direction longitudinally or axially opposed to those of the front locking lugs and springs, as depicted in FIG. 1. In the preferred, double ended embodiment of arbor-holder 21 depicted in the figures, saw cup aperture-engaging rear nose piece 63 having a rear or outer axial face 64 is entirely analogous in structure and function to front nose piece 61 having a front or outer face 62. Moreover, rear nose piece 63 has associated with it structural elements that are identical in structure and function to elements 66 through 96 associated with front nose piece 61 and described in detail above. Thus, the previous discussion of those elements, in conjunction with the ensuing description of the operation of front nose piece 61 of arbor-holder 21, will suffice to fully describe the structure and function of the arbor-holder.

Figure 7:
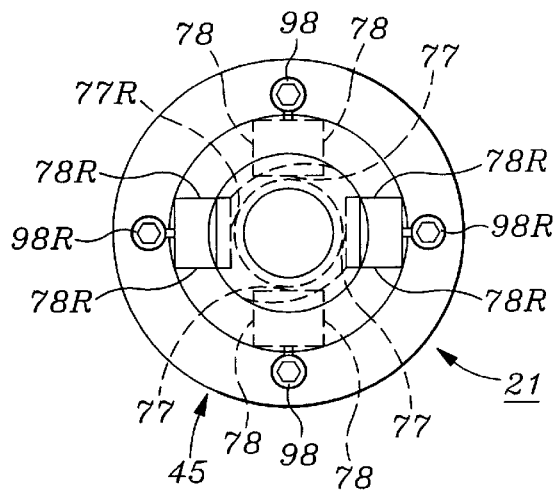
FIG. 7 is a rear elevation view of the arbor-holder of FIG. 3.
Figure 9:
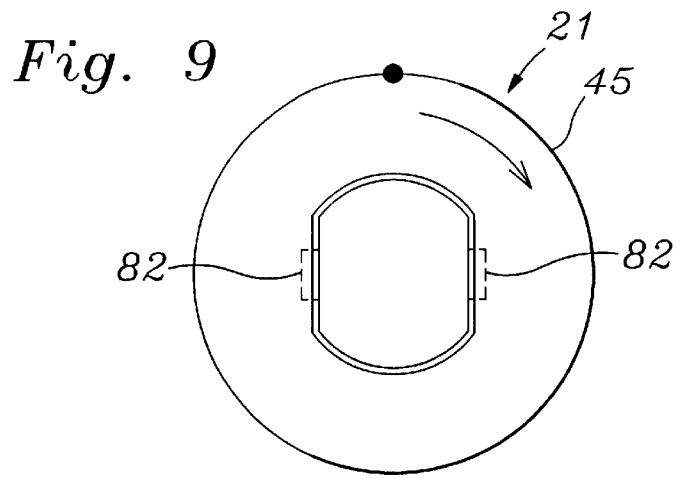
FIG. 9 is a front elevation view of the articles of FIGS. 8A and 8B.

Referring again to FIGS. 1–3, it may be understood that each of the two front locking lugs 81 is preferably installed in arbor-holder 21 by inserting retainer pins 84 of each front locking lug axially forward into a blind retainer pin bore 87, forward axial motion of each front locking lug being limited by contact of the front face 93 of the retainer pin with front transverse end wall 94 of a retainer pin bore 87. Rearward axial motion of each front locking lugs 81 is limited by compression of spring 90 against rear transverse end wall 79 of longitudinal groove 53/74 in which the locking lug is axially slidably received. Preferably, as shown in FIG. 7, a set screw 98 is threaded into the entrance of each front locking lug retainer pin bore 84 after arbor-holder 21 is assembled, to exclude entrance of dust or other foreign matter Into the bore.

It may be understood by referring to FIGS. 1 and 3 that each of two rear locking lugs 81R is preferably installed in arbor-holder 21 by inserting retainer pins 84R of each of the rear locking lugs axially forward into a blind retainer pin bore 87R, forward axial motion of each rear locking lug being limited by contact of the rear face 99R of the retainer pin with front transverse end wall 94R of a retainer pin bore 87R. Rearward axial motion of each rear locking lug 81R is limited by contact of front face 93R of retainer pin 84R with a set screw 98R threaded into the entrance of each rear locking retainer pin bore 87R after arbor-holder 21 is assembled.

As will be made clear in the description of the operation of arbor-holder 21 presented below, attachment of the arbor-holder to a saw cup entails insertion of nose piece 61 of the arbor-holder 21 into aperture 41 of a hold saw cup 22, and axial inward or rearward motion of locking tabs 82 while inner locking body 50 is held axially fixed within collar 45. Immobilization of inner locking body 50 relative to collar 45 during this step may be accomplished simply by applying a forward restraining force on the rear nose piece of arbor-holder 21, or the shank of an arbor 23 protruding rearwardly from the arbor-holder, e.g., by the palm of a hand grasping the collar to install the arbor-holder in a saw cup body. Preferably, however, arbor-holder 21 is provided with integral means for resisting axial motion of inner locking body 50 relative to a collar 45 when locking lug bias springs 90 are axially depressed in response to axially inward motion of locking tabs 82. Thus, as shown in FIGS. 1 and 3, collar 45 of arbor-holder 21 preferably has a threaded bore 100 which is disposed radially between outer cylindrical wall surface 101 and inner cylindrical wall surface 49 of the collar. A ball 102 within bore 100 is urged radially inwardly into a dimple 103 formed in the outer cylindrical wall surface of inner locking body 50 by a compression spring 104 disposed within the bore and retained therein by a set screw 105. Thus constructed, axial motion of inner locking body relative to collar 45 is resiliently resisted with a force adjustable by adjusting compression in spring 104 by turning set screw 105.

Operation of the Invention

The novel functional characteristics of hole saw 20 according to the present invention may be best understood by referring to FIGS. 7–13.

Referring now to FIGS. 7–13, arbor-holder 21 of hole saw 20 is shown with threaded intermediate shank portion 33 of an arbor 23 threaded into threaded bore 25 through the arbor-holder. As is also shown in FIGS. 7–13, the flat and curved portions of the longitudinal side walls of front nose piece 61 are axially aligned with corresponding flat and curved side walls of aperture 41 through base 37 of hole saw cup 22, and the nose piece pushed forward into the saw cup arbor-mounting apertures. During this installation step, axially inward or rearward motion of nose piece 61 with respect to collar 45 is prevented by a radial force exerted on locking body 50 of the nose piece by compression spring 104 and ball 102, or by preventing axial motion of shank 34 of arbor 23, e.g., by pressing the palm of a hand against the rear surface of the shank.

As shown in FIG. 8A, inserting front nose piece 61 of arbor-holder 21 sufficiently far into hole saw cup arbor attachment aperture 41 causes rear surface 106 of hole saw cup base 37 to contact and press front locking tabs 82 axially rearwardly or inwardly within longitudinal locking tab grooves 74. As shown in FIG. 8A, axially inward motion of locking tabs 82 causes the front edge walls 107 of the locking tabs to be pushed rearward or axially inwardly of rear edge walls of transverse grooves 68, as shown in FIG. 8B, thus unblocking and extending the effective circumferential extent of each transverse groove counterclockwise to an axially disposed rib which is located counterclockwise of longitudinal groove 74, from the former limit formed by a clockwise longitudinal edge wall of locking tab 82. The increased effective length of each transverse groove 68 permits front nose piece 61 of the arbor-holder to be rotated counterclockwise with respect to hole saw cup body, as viewed from the front of the arbor-holder and saw cup and shown in FIG. 9. This rotation is enabled by the web portion of aperture 41 of saw cup base 37 being slidably received within that portion of longitudinal groove 74 comprising an extension of transverse groove 68, and which is normally blocked by locking tabs 82 urged forward by locking lug springs 90.

Figure 10:
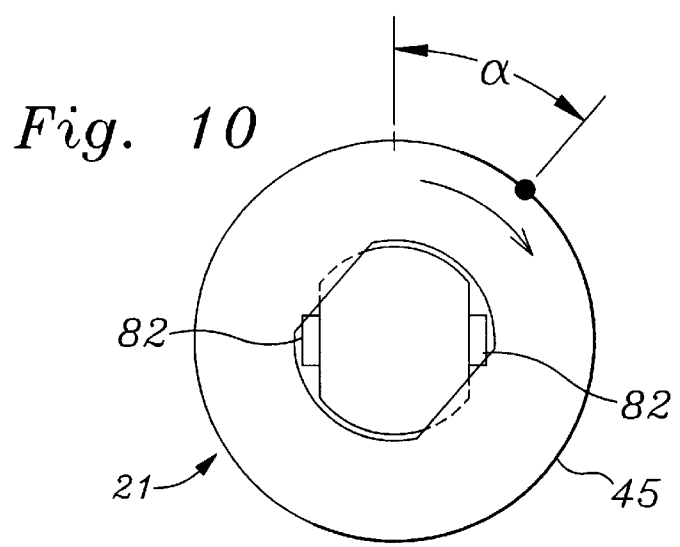
FIG. 10 is a view similar to that of FIG. 9, but showing the arbor-holder rotated approximately 45 degrees clockwise with respect to the saw cup, to lockingly engage with the saw cup.
Figure 11:
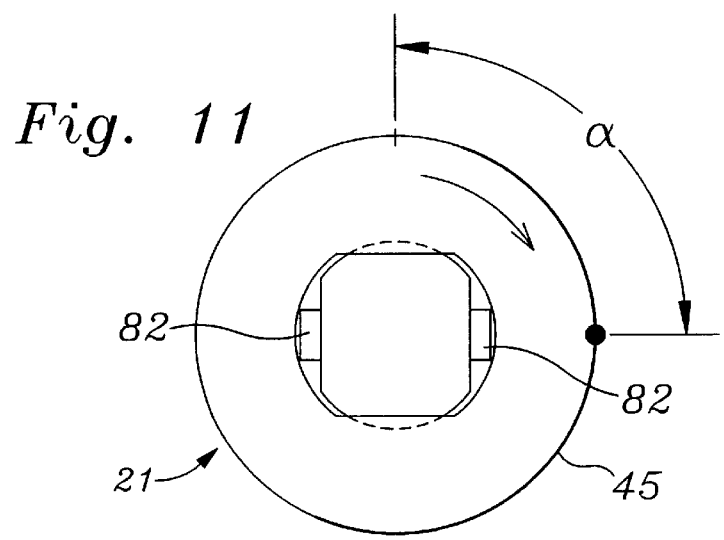
FIG. 11 is a view similar to that of FIG. 10, but showing the arbor-holder rotated approximately 90 degrees with respect to the hole saw cup.

As shown in FIG. 10, when nose piece 61 of arbor-holder 21 has been rotated about 45 degrees with respect to its axially aligned initial position with respect to aperture 41 of hole saw cup 22, radial clearance space between flat portion 67 of nose piece 21 and curved inner peripheral edge wall 43 of the aperture becomes sufficient to allow forward axial motion of locking tabs 82 into the clearance spaces. Further counterclockwise motion of nose piece 61 within aperture 41 of saw cup 22 is limited to about 22-½ degrees by contact of a counterclockwise longitudinal rib 72, with the intersection between the opposed curved 43 and straight 44 peripheral aperture edge walls 72 of aperture 61. Moreover, clockwise rotation of arbor-holder 21 with respect to hole saw cup 22 is limited to about 22-½ degrees by abutting contact between the clockwise edge of a locking tab 82 and an intersection between a curved peripheral wall 43 and a straight peripheral wall 44 of aperture 41, that intersection located clockwise of a second longitudinal nose piece rib 72. Thus installed, saw cup 22 is fixed against axial movement with respect to front nose piece 61 of arbor-holder 21 by front rear edge walls of transverse nose piece grooves 68 embracing perimeter wall 42 of saw cup aperture 41, against counterclockwise rotation of the arbor-holder relative to the saw cup by a longitudinal nose piece rib 72 abutting the aperture perimeter wall, and against clockwise rotation by a locking tab 82 abutting the aperture perimeter wall.

FIGS. 13–15 illustrate how hole saw 20 according to the present invention is used to cut a hole through a workpiece and eject a workpiece plug from the saw.

Referring first to FIG. 13, arbor 23 of hole saw 20 is shown clamped in the chuck B of a power drill A, and the drill powered on to rotate the arbor of arbor-holder 21 and hole saw cup 22 in a clockwise sense to bore a circular hole C through a workpiece D, e.g., a wooden door panel, and thus lodging a cylindrically-shaped plug E cut from the workpiece within the bore of the saw cup.

As shown in FIG. 14, the longitudinal axis of drill A and hole saw 20 are then cocked at an angle with respect to a perpendicular to the longitudinal axis of hole C, lodging the outer surface of hole saw cup 22 against the inner peripheral wall surface of hole C. Then, as shown in FIG. 15, drill A is powered to turn hole saw 22 in a counterclockwise direction. This action causes left-hand threaded arbor 23 to threadingly advance outwardly from the threaded bore of arbor-holder 23, thus advancing collet flange 29 and plug E out from the bore of saw cup 22.

Arbor-holder 21 may be readily removed from a hole saw cup 22 and attached to a different hole saw cup, by first grasping collar 45, and pulling axially rearwardly, as shown in FIG. 8C. This action retracts locking tabs 82 axially inwardly within longitudinal nose piece grooves 74 from transverse grooves 68, thus allowing collar 45 to be rotated ninety degrees clockwise to align the contours of front nose piece 61 with those of saw cup aperture 41, thus permitting the arbor-holder to be pulled rearward to remove the nose piece from the aperture.

If it is desired to attach arbor-holder 21 to a hole saw cup 22 having a different size aperture 41, arbor 23 may be threaded into rear nose piece 63, as shown in FIG. 2, whereupon the rear nose piece may be inserted into the aperture, and the arbor-holder attached to the different size hole cup and used exactly as described above.

In a modification of the plug ejecting hole saw described above, the arbor holder and arbor could both be provided with right-hand threads, thus providing all of the advantages of the basic embodiments described above, including quick interchangeability of different size saw cups, without the plug ejecting capability.

FIGS. 16–22 illustrate adapters for converting non-plug ejecting hole saws with right-hand internal arbor threads into plug ejecting hole saws having left-hand internal threads adapted to receive left-hand threaded, plug-ejecting arbors.

Figure 16:
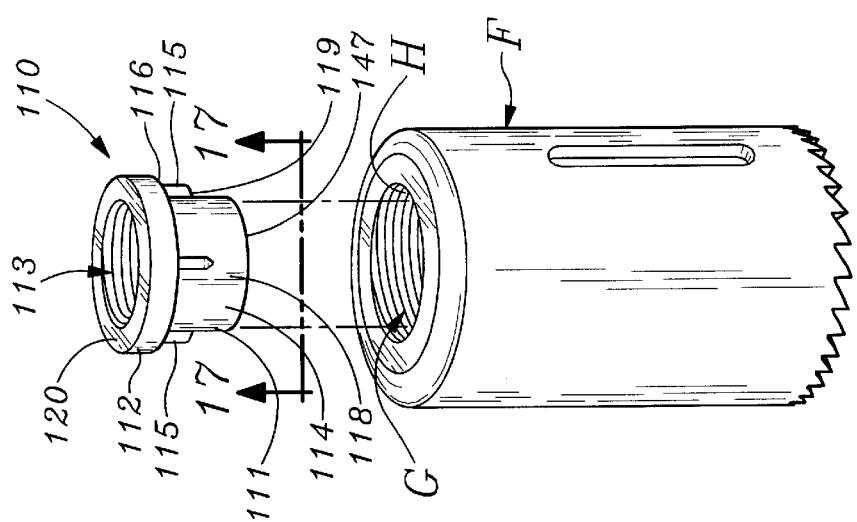
FIG. 16 is a perspective view of a plug ejecting adapter for use with hole a saw cup having right-hand threads.

FIG. 16 shows a plug ejecting adapter 110 for a hole saw cup F having a right-hand threaded bore G for receiving a right-hand threaded arbor (not shown). As shown in FIG. 16, adapter 110 comprises a cylindrical body 111 having at a first, rear end thereof a transversely disposed, circular ring-shaped flange 112 of larger diameter than the body. Body 111 has disposed through its length a left-hand threaded bore 113. Body 111 also has protruding radially outwardly from cylindrical surface 114 thereof a plurality of longitudinally disposed, circumferentially spaced apart axial ribs 115. As shown in FIG. 16, each rib 115 courses axially forward from front annular surface 116 of flange 112, to a location rearward of front annular surface 117 of body 111. As shown in FIG. 17, each rib 115 preferably has a triangular cross-section adapted to cut through threads H of threaded bore G through saw cup F, when adapter 110 is press-fitted into the saw cup bore.

Figure 19:
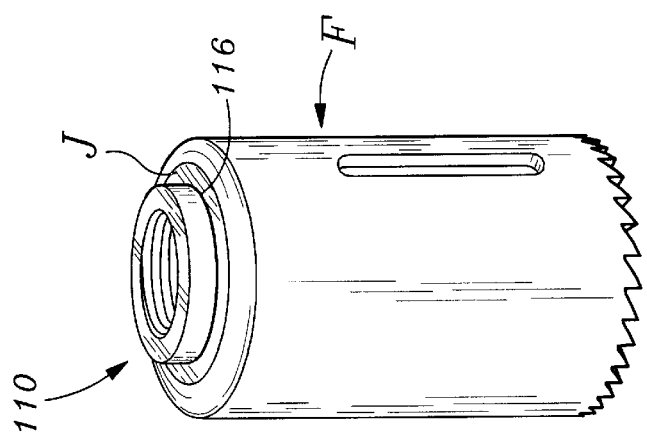
FIG. 19 is a view similar to that of FIG. 18, but showing the adapter fully installed.
Figure 18:
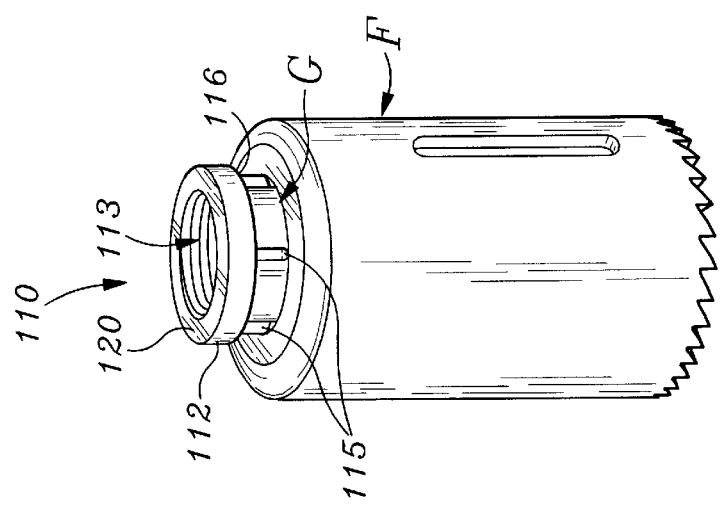
FIG. 18 is a perspective view showing the adapter of FIGS. 16 and 17 partially installed in a saw cup.

Referring now to FIGS. 17 and 18, it may be seen that a front portion 118 of cylindrical wall surface 114 of adapter 110 forward of front transverse ends 119 of ribs 115 has a diameter slightly less, e.g., 0.001 inch, less than the minimum inner diameter of threaded bore G of saw cup F. Thus, as shown in FIG. 18, when force is applied to rear annular surface 120 of adapter flange 112 to drive body 111 of adapter 110 partially into bore G, bore 113 through the adapter is aligned with bore G. Then, when adapter 110 is pressed fully into bore G of saw cup F, as shown in FIG. 19, front annular surface 116 of rear adapter flange 112 seats on rear annular surface J of saw cup F. In this position, ribs 115 of adapter 16 fit tightly into longitudinally disposed grooves cut into saw cup threads H, by driving the adapter into the saw cup bore, thus tightly gripping the ribs and securing the adapter to the saw cup, which may then be used with a left-hand threaded plug ejecting arbor in the manner described above.

FIGS. 20–22 illustrate a modification 120 of adapter 110. Modified adapter 120 is particularly well adapted for use with hole saw cups of larger diameter, requiring larger drive torques. FIGS. 20 and 21 show a plug ejecting adapter 120 for a hole saw cup F, having a right-hand threaded bore G1 for receiving a right-hand threaded arbor (not shown). As shown in FIG. 20, hole saw cup F1 has through rear base wall K1 thereof a pair of apertures L1 located on diametrically opposed sides of saw cup bore G1.

As shown in FIGS. 20 and 21, modified adapter 120 includes a cylindrical body 121 having at a first rear end thereof a transversely disposed flange 122. Flange 122 has a central circular portion 123 of larger diameter than body 121, and a pair of diametrically opposed, semi-oval-shaped wings 124 which protrude radially outwardly from the central circular portion of the flange.

Modified adapter 120 also has a pair of parallel engagement pins 125 which protrude axially forward from front annular surface 126 of flange 122. As shown in FIG. 20, pins 125 are preferably of about the same length as body 121 of adapter 120, are of smaller diameter than apertures L1 through saw cup base K1, and are axially alignable with the apertures. Body 121 of adapter 120 has disposed through its length a left-hand threaded bore 133. Body 121 also has protruding radially outwardly from cylindrical surface 134 thereof a plurality of longitudinally disposed, circumferentially spaced apart axial ribs 135. As shown in FIG. 20, each rib 135 courses axially forward from front annular surface 126 of flange 122, to a location rearward from front annular surface 137 of body 121. As shown in FIG. 22, each rib 135 preferably has a triangular cross-section which is adapted to cut through threads H1 of threaded bore G1 through saw cup F1, when adapter 120 is press-fitted into the saw cup bore.

Adapter 120 is installed in saw cup F1 in exactly the same manner as adapter 110 is installed in saw cup body F and described above. Thus installed, engagement pins 125 are received in apertures L1 through rear base wall K1. With this arrangement, large torques between adapter 120 and saw cup F which might dislodge ribs 135 from bore G1 of the saw cup are prevented from doing so by pins 125 held in apertures L1 and thereby preventing relative rotation between the adapter and saw cup.

What is claimed is:

1. A hole saw comprising;

a. a saw cup having a cylindrical cup-shaped body having a front annular cutting surface, a cylindrical shell terminated at a rear annular end thereof by a rear circular base wall having through its thickness dimension a non-circular aperture concentrically aligned with said front annular cutting surface and said shell, b. an arbor holder removably attachable to said saw cup, said arbor holder including a generally cylindrically-shaped body having therethrough a longitudinally disposed, coaxial bore internally threaded for receiving an externally threaded arbor, said arbor holder having a cylindrically ring-shaped outer collar which holds there in an axially disposed inner generally cylindrically-shaped central body having a nose piece which protrudes longitudinally forward from said collar, said nose piece having a transverse cross-sectional shape congruent with said saw cup aperture and being insertable into said saw cup aperture and rotatable to lock said arbor holder and saw cup against relative longitudinal movement, and to limit relative rotational movement of said arbor holder relative to said saw cup, said arbor holder having at least a first locking tab located radially inwardly of a longitudinally disposed cylindrical outer surface of said collar, said locking tab being longitudinally slidably held within a first longitudinally disposed groove formed in said central body and urged forward by first forward biasing spring means to a location rearward of a front transverse face of said nose piece in which location said first tab obstructs a first transversely disposed groove formed in said nose piece, said first tab being translatable rearwardly in said first longitudinally disposed groove by contact of a front portion of said first tab with said rear base wall of said saw cup when said nose piece is inserted into said aperture through said base wall, thus unblocking said first transverse groove and allowing said arbor holder to be rotated in a first sense with respect to said saw cup, said transverse groove rotatably receiving an adjacent portion of a peripheral edge wall of said saw cup bordering said aperture, said arbor holder being rotatable further in a first sense to longitudinally align said tab with a larger diameter portion of said aperture, whereby said first tab is urged forward into said larger diameter portion of said aperture by said first spring means to block said first transverse groove and thereby lock said arbor holder to said saw cup, c. an arbor having a rear shank portion adapted to be clampingly received in a chuck of a power drill, a central longitudinally elongated threaded portion adapted to be threadingly received within said threaded bore through said arbor holder, and a front collet flange portion for clampingly receiving a shank of a pilot drill, and d. A pilot drill held in said collet flange of said arbor holder, said pilot drill being coaxial with and having a tip protruding forward of said front annular surface of said saw cup.

2. The hole saw of claim 1 further including retraction means for retracting said first tab within said first longitudinally disposed groove to unblock said first transverse groove, thereby allowing said arbor holder to be rotated in a second sense to congruently align said nose piece and said aperture, thereby permitting withdrawal of said nose piece and arbor holder from said saw cup.

3. The hole saw of claim 2 wherein said retraction means is further defined as comprising in combination first rearward biasing spring means urging said inner cylindrical body of said arbor holder rearward or axially inwardly within said collar, and abutting contact surfaces between said tab and said collar, whereby axial rearward relative motion of said collar relative to said central body translates said first tab rearwardly in said first longitudinal groove.

4. The hole saw of claim 3 wherein said bore through said arbor holder is further defined as being a left-hand threaded bore disposed through said central body of said arbor holder.

5. The hole saw of claim 3 further including longitudinal movement inhibiting means for resisting relative longitudinal motion between said collar and said central body of said arbor holder.

6. The hole saw of claim 5 wherein said longitudinal movement inhibiting means is further defined as comprising in combination a depression in an outer surface of said central body, a radially disposed bore through said collar aligned with said depression, and a detent member protruding partially from said bore and resiliently urged into said depression.

7. The hole saw of claim 1 wherein said threads of said arbor holder bore and said arbor are left-handed, whereby a clockwise torque on said arbor relative to said saw cup retracts said collet flange of said arbor holder against an inner surface of said base wall of said saw cup, and counterclockwise rotation of said arbor relative to said saw cup advances said collet flange axially outwardly in said saw cup.

8. The hole saw of claim 1 further including a second locking tab located radially inwardly of said longitudinally disposed cylindrical wall surface of said collar, said second locking tab being longitudinally slidably held within a second longitudinally disposed groove spaced circumferentially apart from said first longitudinal groove and urged forward by second forward biasing spring means to a location rearward of said front transverse face of said nose piece in which said second tab obstructs a second transversely disposed groove formed in said nose piece, said second tab being translatable rearwardly in said second longitudinally disposed groove by contact of a front portion of said second tab with said rear base wall of said saw cup.

9. A hole saw comprising;

a. a saw cup having a cylindrical cup-shaped body provided at a front annular surface thereof with angled cutting teeth protruding forward therefrom, and a cylindrically-shaped shell terminating at a rear annular end thereof by a transversely disposed rear circular base wall having through its thickness dimension a non-circular aperture concentrically aligned with said front annular surface and said shell, said aperture having a pair of straight sides diametrically opposed at ends of a first diameter of said aperture and a pair of concave, arcuately curved sides diametrically opposed at opposite ends of a second diameter of said aperture which perpendicularly bisects said first diameter, b. an arbor holder removably attachable to said saw cup, said arbor holder including a generally cylindrically-shaped body having therethrough a longitudinally disposed, coaxial bore provided with internal threads for threadingly receiving an externally threaded arbor, said arbor holder having a cylindrically ring-shaped collar which holds longitudinally slidably therewithin a longitudinally disposed, inner generally cylindrically-shaped central body having a first, front nose piece which protrudes longitudinally forward of said collar, said front nose piece having a transverse cross-sectional shape substantially congruent with that of said saw cup aperture, said central body having formed therein first and second circumferentially spaced apart, longitudinal locking tab-receiving grooves disposed longitudinally rearward into said central body from a location rearward of a front transverse face of said front nose piece, each of said first and second longitudinal grooves communicating on one longitudinal side thereof with first and second transversely disposed groove, respectively, and on an opposite longitudinal side hereof with a first and second transversely disposed grooves, respectively, and on an opposite longitudinal side thereof by first and second longitudinally disposed ribs, respectively, on front ends thereof by first and second front transversely web walls, and at rear ends thereof by first and second rear web walls, each of said first and second longitudinal grooves longitudinally slidably holding therewithin first and second front locking tab members, respectively, each of said first and second tab members including a front generally rectangularly-shaped tab having a front transverse edge wall urged forward into abutting contact with a said front transversely disposed web wall of longitudinal grooves in said nose piece by first and second front forward biasing compression springs disposed longitudinally between said rear web wall and a rear wall of each of said locking tab members, said first and second front locking tabs each having a front longitudinally disposed portion which protrudes radially outwards of said groove which is translatable rearwardly when said front nose piece is inserted into said aperture through said base wall of said saw cup, thus unblocking said first and second front transverse grooves and allowing said arbor holder to be rotated in a first sense with respect to said saw cup, each of said first and second front transverse grooves rotatably receiving an opposite one of a said pair of peripheral edge walls bordering said aperture, said arbor holder being rotatable with respect to said saw cup in said first sense to longitudinally align said first and second front tabs with first and second larger diameter portions of said aperture, whereby said first and second tabs are urged forward by said first and second front forward biasing spring means to block said first and second front transverse grooves, thereby limiting rotational disengagement of said arbor holder in a second sense, rotation in said first sense being limited by contact of an aperture edge wall with a said first or second longitudinal ribs, c. an arbor having a rear shank portion adapted to be clampingly received in a chuck of a power drill, a central longitudinally elongated threaded portion adapted to be threadingly received within said threaded bore through said arbor holder, and a front collet flange portion for clampingly receiving a shank of a pilot drill, and d. a pilot drill held in said collet flange of said arbor holder, said pilot drill being coaxial with and having a tip protruding forward of said front annular surface of said saw cup.

10. The hole saw of claim 9 further including means for retracting said first and second front locking tabs longitudinally inwardly within said first and second front longitudinally disposed grooves to unblock said first and second front transverse grooves of said nose piece, thereby allowing said arbor holder to be rotated in a second sense to congruently align said nose piece and said aperture of said saw cup, thereby permitting withdrawal of said nose piece and arbor from said aperture.

11. The hole saw of claim 10 wherein said retraction means is further defined as comprising in combination means for longitudinally slidably holding said central body within said collar, rearward biasing spring means urging said central body longitudinally inwardly within said collar, and abutting contact surfaces between said first and second front tabs and said collar, whereby longitudinal rearward motion of said collar relative to said central body translates said first and second front tabs rearwardly in said first and second front longitudinal grooves.

12. The hole saw of claim 11 wherein said central body is further defined as including a second, rear nose piece which protrudes longitudinally rearward of said collar, said rear nose piece having a transverse cross-sectional shape substantially congruent with that of a second aperture through a second said saw cup similar to but of a different size than said aperture through said first saw cup, said central body having formed therein first and second rear longitudinally disposed grooves longitudinally slidably holding first and second rear locking tabs, first and second rear transverse grooves communicating with said first and second rear longitudinal grooves, and first and second rear springs urging said rear locking tabs rearward, said rear grooves, locking tabs, and springs being exactly analogous in structure and function to corresponding elements of said front nose piece, respectively, but spaced circumferentially apart therefrom.

13. The hole saw of claim 12 wherein said first and second rear spring means comprise said rearward biasing spring means for urging said central body rearward within said collar.

14. The hole saw of claim 13 wherein said first and second front spring means comprise forward biasing spring means for urging said central body forward within said collar.

15. The hole saw of claim 14 wherein said threads of said arbor holder bore and said arbor are left-handed.

16. The hole saw of claim 14 further including axial motion inhibiting means for resisting axial motion of said central body relative to said collar.

17. The hole saw of claim 16 wherein said axial motion inhibiting means is further defined as comprising in combination a depression in an outer surface of said central body, a radially disposed bore through said collar aligned with said depression, and a ball protruding partially from said bore and resiliently urged into said depression.

* * * * *